May 21, 1963     H. C. SCHEPLER     3,090,831
SATELLITE MONITOR
Filed Aug. 15, 1961
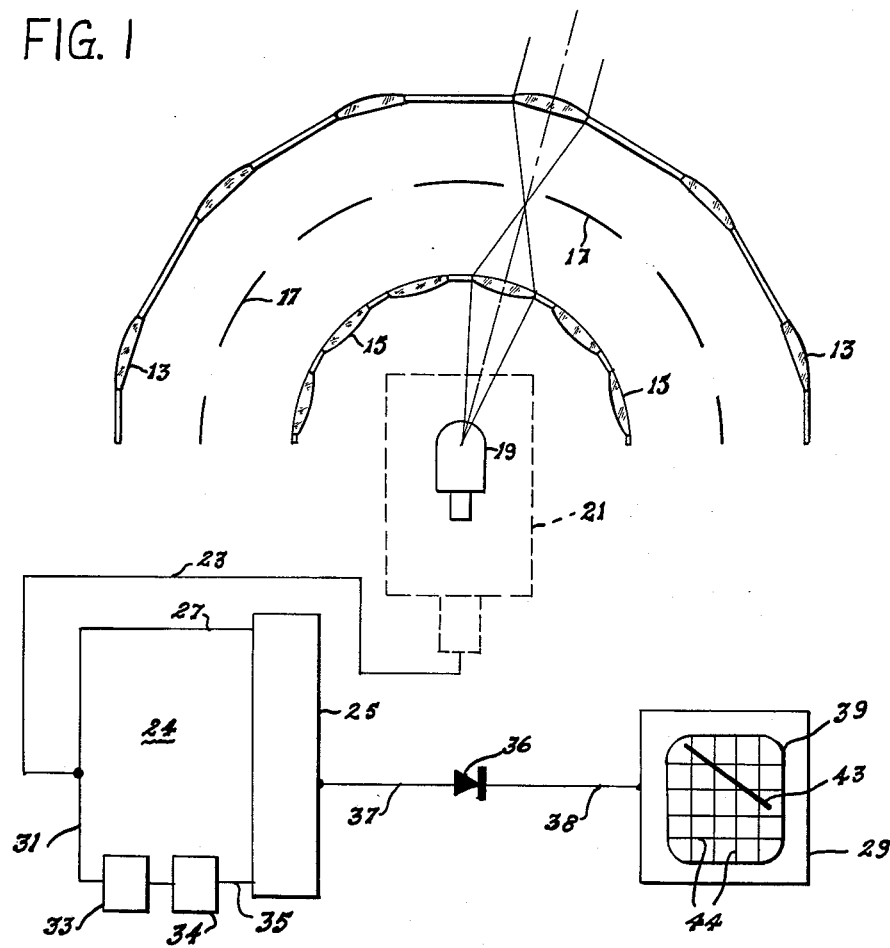
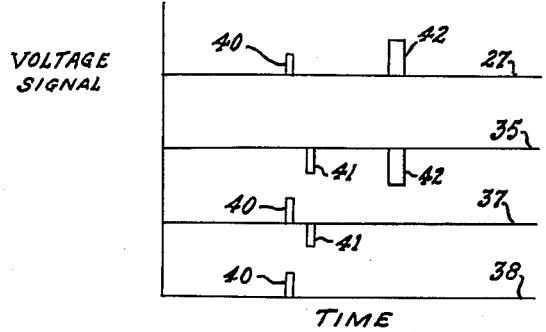
INVENTOR.
HERMAN C. SCHEPLER

United States Patent Office 3,090,831
Patented May 21, 1963

3,090,831
SATELLITE MONITOR
Herman C. Schepler, 5519 Via del Vallee,
Torrance, Calif.
Filed Aug. 15, 1961, Ser. No. 131,690
4 Claims. (Cl. 178—6.8)
(Granted under Title 35, U.S. Code (1952), sec. 266)

The invention described herein may be manufactured and used by or for the United States Government for governmental purposes without payment to me of any royalty thereon.

This invention relates to an instrument for tracking an object moving in a star-filled sky. More particularly, the invention is concerned with providing an apparatus which includes a television monitoring arrangement for acquiring and tracking a flying or an orbiting object, such as a satellite, as it moves across the celestial sphere. The direction and velocity of the moving satellite is presented in graphical form on a television screen.

The relative motion of a satellite with respect to various fixed bodies in the celestial sphere is its distinguishing feature for its detection and tracking. It is generally extremely difficult to locate a satellite in a star-filled sky where each star resembles a potential satellite to a searching observer. Each star must be checked for lack of motion and the psychologically apparent motion of a fixed star presents an additional handicap to the observer searching for the orbiting satellite.

The present invention discloses an optical system combined with a television pick-up tube and camera. The output from the camera is fed through a bridge circuit to a television receiver. The various components are arranged in such a manner that the signal from the television camera passes through opposite arms of the bridge circuit resulting in effectively cancelling the signals from all relatively stationary bodies in the celestial sphere. Only the signal from a moving object, such as a satellite, is not electrically cancelled in the bridge causing a signal to pass through the bridge and appear on the picture tube.

Accordingly, it is an object of the present invention to provide apparatus which is useful for distinguishing the presence of a satellite in the celestial sphere from the planets and stars that are permanently situated therein.

Another object of the invention is to provide automatic means for determining the path and velocity of an orbiting satellite.

Still another object of the invention is to provide optical and electrical means for depicting the path of a satellite passing through the celestial sphere containing a large number of heavenly bodies, said means being capable of differentiating between the satellite and the heavenly bodies.

A still further object of the invention is to provide an arrangement whereby the signals from a television camera are passed through a bridge circuit causing certain portions to be cancelled and allowing other portions to reach a television receiver.

These and many other objects, features and advantages will become more apparent from the following description taken in conjunction with the illustrative embodiment in the accompanying drawing wherein:

FIGURE 1 shows a schematic view of the entire arrangement including the optical lens system, apertured mask, and television pick-up and display system; and FIGURE 2 is a time-voltage diagram representing a signal from a moving object such as a satellite.

Referring now to FIGURE 1, the apparatus according to the invention is shown schematically and includes a series of objective lenses 13 arranged in the form of a hemisphere. Radially and inwardly spaced from each of said objective lenses 13 are corresponding projection lenses 15 also hemispherically arranged. Interposed between the lenses 13 and 15 is an apertured member 17 placed so that each corresponding pair of lenses is in optical alignment with one of the apertures. Thus, the image formed by each lens system passes unrestricted in a radial direction to the center of the hemisphere. The apertured member 17 operates to prevent any overlapping or confusion of the different images passing through adjacent lens systems. (In the case where overlap of images is allowable, items 15 and 17 can be omitted and the lenses in item 13 can have such focal length and position so as to minimize this overlap.)

Located at the center of the hemisphere is a television camera pick-up tube 19. Because of its location all of the images which pass through the lens system impinge on the pick-up tube 19. The output from the television camera 21 is then fed through the line 23 to a bridge circuit 24. The image signal in bridge arm 27 passes directly through the bridge to the differential amplifier 25 and to a television receiver 29. However, the image signal 31 first passes through a delay line 33, in which the delay time exceeds the resolution of the immediate and delayed satellite images on the television camera pick-up tube 19. Thereafter the delayed signal passes through a phase shifter 34, which operates to shift the phase of the delayed camera output signal by 180 degrees. Thus the direct line signals 27 are matched by their corresponding delay line and reversed phase signals 35 resulting in a cancellation of both signals. Only unmatched signals such as from a satellite normally pass through to the television receiver 29. A diode 36 inserted in the line between the differential amplifier 25 and the receiver 29 blocks passage of any negative ghost signals and prevents them from reaching the receiver 29.

Referring to the Time-Voltage diagrams shown in FIGURE 2, 40 represents a signal from a moving object such as a satellite; 41 represents the signal from a moving object such as a satellite after the signal has been delayed and its phase shifted by 180 degrees; and 42 represents the signal from a fixed object such as a star. 27 in the Time-Voltage signal diagrams shows the voltage signal from a moving object 40 and a fixed object 42 in the bridge arm 27 of the schematic diagram. 35 shows the voltage signal from a moving object 41 and a fixed object 42 after the signal has been delayed and its phase shifted by 180 degrees as in 35 of the schematic diagram. 37 shows the voltage signal in 37 of the schematic diagram after signals 27 and 35 have been combined through the differential amplifier 25. 38 shows the voltage signal in 38 of the schematic diagram going to the receiver 29 after the diode 36 has blocked the negative ghost signal 41 from the signal in 37.

In using the device for monitoring a satellite orbiting the earth, the apparatus operates by receiving images from heavenly bodies including the satellite on the objective lenses 13. The images then pass through the aligned apertures in the member 17 to corresponding projection lenses 15. After passing through the projection lenses 15 the images impinge on the pick-up tube 19 of the television camera 21 thereby translating the image into an electrical impulse type signal. Thus, the output 23 of the camera 21 comprises a series of electrical impulses which represent the heavenly bodies in the celestial sphere including the orbiting satellite.

A bridge type circuit is interposed between the television receiver 29 and the camera 21. This circuit operates to distinguish the satellite signal from the other signals generated by the stars and planets. As the output 23 passes directly through one part of the bridge circuit to the receiver 29, it is also simultaneously fed through another part of the bridge circuit which includes a delay line 33 for the purpose of delaying in time and a phase shifter 34 for the purpose of shifting by 180° the phase of the camera output 23. This causes substantially opposite electrical signals 27 and 35 to enter parallel arms of the bridge and results in effectively cancelling the output 23 with the exception of the satellite signal which occurs in a different portion of the time cycle because of its movement in the sky. Since only the satellite signal is not matched in the bridge, and the diode 36 has blocked passage of the negative ghost signal in 37, the television receiver 29 receives only this unmatched signal 38.

A display tube 39 having a grid face 44 is provided for displaying the satellite signal 38 received from the bridge. When properly calibrated, the display tube 39 will show a track 43 corresponding to the signal 40 in line 38 indicating the direction and velocity of the orbiting satellite.

From the foregoing it will be seen that the invention has been presented with particular emphasis on a certain preferred embodiment. It will be apparent to one skilled in the art that certain changes, alterations, modifications and substitutions can be made in the arrangement and location of the various elements without departing from the true spirit and scope of the invention as defined in the amended claims.

Having thus set forth and disclosed the nature of my invention, what I claim is:

1. An astronomical instrument for monitoring objects in the celestial sphere, said instrument comprising a series of objective lens elements mounted in the form of a hemisphere, a series of corresponding projection lenses radially inwardly spaced from said objective lens elements, each of said projection lenses being in optical alignment with a corresponding objective lens element, an apertured member interposed between said series of objective lens elements and projection lenses, each of the apertures in said apertured member being in alignment with a corresponding objective lens element and projection lens to allow unrestricted passage of image carrying light therethrough, a photosensitive device disposed at the geometric center of said hemisphere for receiving image carrying light from the lens systems and translating said light into electrical impulses, and means for discriminating between said electrical impulses such that the impulses created by light from relatively stationary objects are cancelled while the impulses from moving objects are allowed to pass to a display tube indicating the direction and velocity of the moving object.

2. The astronomical instrument defined in claim 1 wherein the photosensitive device for receiving image carrying light from the lens systems comprises a television camera having a photosensitive pick-up tube, the output of said television camera being connected to a television receiver having a screen for displaying the signals supplied by said camera.

3. The astronomical instrument defined in claim 1 wherein the means for discriminating between the electrical impulses originating in said photosensitive device comprises a bridge circuit through which the electrical impulses pass, said bridge circuit including a delay line and a phase shifter for creating signals of opposite polarity, certain of said signals effectively cancelling each other allowing only unmatched signals to reach the display tube.

4. An astronomical instrument for monitoring objects in the celestial sphere, said instrument comprising a series of objective lenses mounted in the form of a hemisphere, a series of corresponding projection lenses radially inwardly spaced from said objective lenses, each of said projection lenses being in optical alignment with a corresponding objective lens, a television camera having a television pick-up tube mounted in the geometric center of said hemisphere for receiving images after passage through the objective and projection lenses, said television pick-up tube operating to translate the received images into electrical impulses, electrical means for discriminating among said impulses comprising a bridge circuit through which said impulses pass, one arm of said bridge circuit including a delay line for displacing in time the signal from a fast moving object and a phase shifter for shifting by 180° the phase of the incoming signals, a differential amplifier for combining the signals and effectively operating to cancel the out-of-phase matched signals not displaced by the delay line, a diode in the output line of said differential analyzer for preventing passage of negative impulses, and a television receiver having a picture tube for displaying the positive pulses not cancelled by said discriminating means such that the velocity and direction of movement of the object responsible for said uncancelled positive impulse is displayed on said picture tube.

References Cited in the file of this patent

UNITED STATES PATENTS

| | | |
|---|---|---|
| 2,923,220 | Bouwers | Feb. 2, 1960 |
| 3,010,024 | Barnett | Nov. 21, 1961 |
| 3,042,915 | Nordell | July 3, 1962 |

OTHER REFERENCES

"Moving-Target Detector," McLucas and Laughlin, Electronics, August 1954, pp. 169–171.